US012578719B2

(12) United States Patent
Mitra et al.

(10) Patent No.: US 12,578,719 B2
(45) Date of Patent: Mar. 17, 2026

(54) PREDICTION OF REMAINING USEFUL LIFE OF AN ASSET USING CONFORMAL MATHEMATICAL FILTERING

(71) Applicant: PALO ALTO RESEARCH CENTER INCORPORATED, Palo Alto, CA (US)

(72) Inventors: Peetak P. Mitra, San Francisco, CA (US); Kai Frank Goebel, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 637 days.

(21) Appl. No.: 18/105,317

(22) Filed: Feb. 3, 2023

(65) Prior Publication Data

US 2024/0264590 A1 Aug. 8, 2024

(51) Int. Cl.
*G05B 23/02* (2006.01)
(52) U.S. Cl.
CPC ..... *G05B 23/0283* (2013.01); *G05B 23/0254* (2013.01)
(58) Field of Classification Search
CPC .......................... G05B 23/0283; G05B 23/0254
See application file for complete search history.

(56) References Cited

U.S. PATENT DOCUMENTS

| | | | | |
|---|---|---|---|---|
| 2008/0140360 A1* | 6/2008 | Goebel | ................... | G06F 30/20 |
| | | | | 703/2 |
| 2018/0046902 A1* | 2/2018 | Liao | ....................... | G06N 3/045 |
| 2019/0025376 A1* | 1/2019 | Saha | ................... | H01M 10/054 |
| 2020/0104437 A1* | 4/2020 | Yu | ............................ | G06N 7/01 |
| 2020/0116585 A1* | 4/2020 | Jung | ................. | G05B 23/0283 |
| 2022/0057766 A1* | 2/2022 | Cao | ........................... | G06N 5/04 |

FOREIGN PATENT DOCUMENTS

CN 111258297 A * 6/2020 ......... G05B 23/0283

OTHER PUBLICATIONS

Intelligent Prognostics of Degradation Trajectories for Rotating Machinery Based on Asymmetric Penalty Sparse Decomposition Model (Year: 2018).*

Two-phase degradation data analysis with change-point detection based on Gaussian process degradation model (Year: 2021).*

(Continued)

*Primary Examiner* — Mohamed Abou El Seoud
(74) *Attorney, Agent, or Firm* — Mueting Raasch Group

(57) ABSTRACT

A system determines that an asset of an engineering system has transitioned from a quasi-steady degradation stage to an accelerated degradation phase based on sensor measurements received from an asset. During the accelerated degradation phase, features are extracted from the sensor measurements that are indicative of wear of the asset. A conformal mathematical filter is applied to the features that causes the features to conform to a wear curve formulation associated with the asset. An output of the filter is resampled to form a noise-reduced signal. The noise-reduced signal is input into a sequence machine learning model. A loss function of the sequence machine learning model uses an increased penalty to overprediction and a relaxed penalty for underprediction. An output of the sequence machine learning model is used to predict a remaining useful life (RUL) of the asset.

20 Claims, 11 Drawing Sheets

(56)      References Cited

OTHER PUBLICATIONS

Two-phase degradation modeling and remaining useful life prediction using nonlinear wiener process (Year: 2021).*

A RUL Estimation System from Clustered Run-to-Failure Degradation Signals (Year: 2022).*

Lei et al., "Machinery health prognostics: A systematic review from data acquisition to RUL prediction," 2018, Mechanical Systems and Signal Processing, 104:799-834.

Loutas et al., "Remaining Useful Life Estimation in Rolling Bearings Utilizing Data-Driven Probabilistic E-Support Vectors Regression," Dec. 2013, IEEE Transactions on Reliability, 62(4):821-32.

Nectoux et al., "Pronostia: An experimental platform for bearings accelerated degradation tests," Jun. 2012, IEEE International Conference on Prognostics and Health Management [Denver, Colorado]. 9 pages.

Yang et al., "Remaining useful life prediction of induction motors using nonlinear degradation of health index," 2021, Mechanical Systems and Signal Processing, 148: 17 pages.

* cited by examiner $$\frac{da}{dN} = C(\Delta K)^m$$

$$k = Ae^{-(Ea/RT)}$$

PREDICTION OF REMAINING USEFUL LIFE OF AN ASSET USING CONFORMAL MATHEMATICAL FILTERING

SUMMARY

The present disclosure is directed prediction of remaining useful life of an asset using conformal mathematical filtering. In one embodiment, a computer-implemented method involves, based on sensor measurements received from an asset of an engineering system, determining that the asset has transitioned from a quasi-steady degradation stage to an accelerated degradation phase. During the accelerated degradation phase, the method involves: extracting features from the sensor measurements that are indicative of wear of the asset; applying a conformal mathematical filter to the features, the conformal mathematical filter causing the features to conform to a wear curve formulation associated with the asset, an output of the filter being resampled to form a noise-reduced signal; inputting the noise-reduced signal into a sequence machine learning model, a loss function of the sequence machine learning model using an increased penalty to overprediction and a relaxed penalty for underprediction; and using an output of the sequence machine learning model to predict a remaining useful life (RUL) of the asset In another embodiment, an engineering system includes one or more assets and one or more sensors that provide prognostics data about the one or more assets. A monitoring system is coupled to the engineering system. The monitoring system includes an external data interface that receives the prognostics data from the one or more sensors. A processor of the monitoring system is coupled to the external data interface and operable to perform, during an accelerated degradation phase of the one or more assets: extracting features from the prognostics data that are indicative of wear of the asset; applying a conformal mathematical filter to the features, the conformal mathematical filter causing the features to conform to a wear curve formulation associated with the asset, an output of the filter being resampled to form a noise-reduced signal; inputting the noise-reduced signal into a sequence machine learning model, a loss function of the sequence machine learning model using an increased penalty to overprediction and a relaxed penalty for underprediction; and using an output of the sequence machine learning model to predict a remaining useful life (RUL) of the asset. A user interface is coupled to the processor that communicates the prediction of the RUL to a user.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to a system and method for prognosis reasoning, e.g., estimating remaining useful life (RUL) of engineering assets, systems, sub-systems, components, etc., based on hybrid physics machine learning reasoning. Methods and systems are described for prognostics of engineering assets, systems, sub-systems, and components based on hybrid physics machine learning reasoning.

Figure 1:
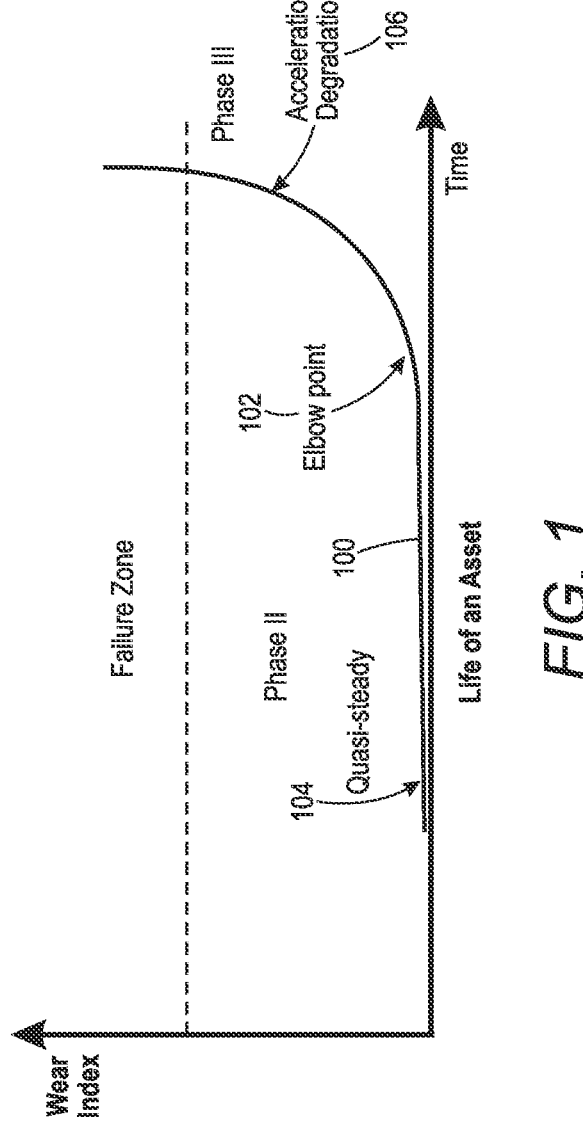
FIG. 1 is a block diagram of health stages used in prognosis according to an example embodiment.

Reliably predicting RUL for an engineering asset remains a challenge for predictive health maintenance tasks. This challenge can be simplified by the fact that many asset classes share failure modes with similar characteristics. Frequently, they can be divided into two main phases—a quasi-steady phase of slow degradation followed by an accelerated degradation phase leading to the failure threshold. An example of these phases is shown in the diagram of FIG. 1. This figure shows a plot 100 of a wear index over time, indicates an elbow point 102 that generally demarcates a quasi-steady phase 104 and an accelerated degradation phase 106.

The accelerated phase 106 starts at a point that is hard to predict for various reasons. For example, the accelerated degradation may initiate to material variations or manufacturing differences that respond to particular stressors in a manner that has stochastic properties at a small or granular level of observation. Oftentimes, sensor measurements cannot capture these micromechanical property changes. At any rate, the timescales of the quasi-steady 104 can vary widely between assets and operating conditions, e.g., on the order of minutes in the case of batteries, on the order of years in the case of bearings.

One challenge in prognostics systems then is to capture the transition from quasi-steady phase 104 to accelerated phase 106 by detecting the so-called elbow point 102. The emphasis of the prediction is focused on the accelerated phase 106. This disclosure relates to adding mathematical filters that conform to popular formulations of wear curve to resample the noisy, raw, hard-to-model signals. This improves model performance significantly for a family of sequence-based machine learning models. Given the nature of the common failure modes, solutions built for one asset can be reasonably adapted for other engineering assets, with very little effort.

One current technique for RUL estimation involves modeling the accelerated degradation phase 106 by fitting machine learning models directly to raw, input signals. This strategy works well for simulation-based or smooth data. However, field data are often noisy, contain missing values and are difficult to work with. In embodiments described below, conformal mathematical filters (conformity to popular family of wear curves) are applied to preprocess the noisy data for resampling. The mathematical filter can be adapted to suit the wear curve formulation for the underlying asset. This step makes the data suitable to be used for sequence-based machine learning models such as neural ordinary differential equations (ODE), physics-informed neural networks (which can embed or approximate partial differential equations), or recurrent neural networks (RNN). During the training process we additionally impose exponential loss functions to constrain the model from severely over-predicting, thereby ensuring boundedness, conservative predictions, and convergence.

Figure 2:
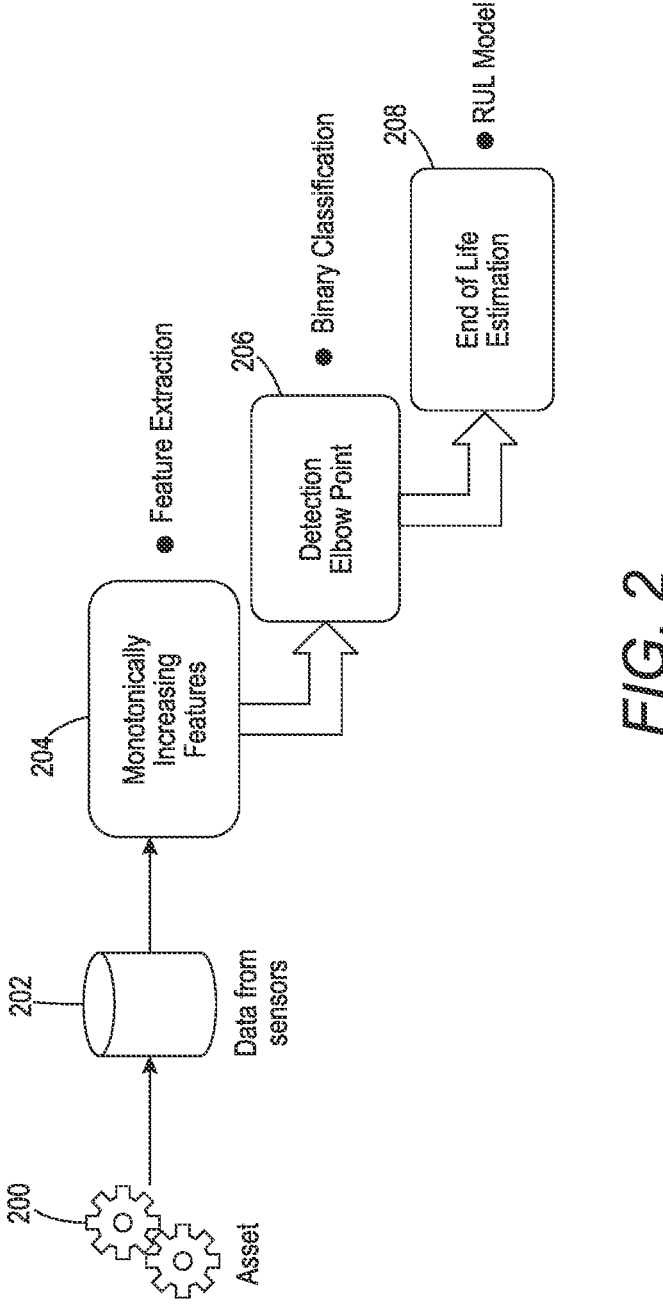
FIGS. 2 and 3 are a block diagrams showing workflows of a prognostics model according to example embodiments.

In FIG. 2, a block diagram shows an overall workflow according to an example embodiment. Sensor measurements/data 202 are received from an asset 200 of an engineering system. This data 202 is generally very noisy and may also be sampled at high frequency that makes it unsuitable to directly use it for machine learning. Therefore features 204 are derived from the data 202 leveraging a known feature engineering techniques such as data cleaning, noise isolation, transformation, etc. The features 204 (e.g., kurtosis, Fourier transform spectra, wavelets) are indicative of wear of the asset, and may be selected to have characteristics such as monotonicity, trendability and prognostibility. Taking in noisy data and applying statistical metrics relevant in the field of predictive maintenance generally results in signal based on the features 204 that are monotonically increasing over time, indicating they capture some sense of the wear happening in the asset that is monitored. The features are less noisy than the original data 202 but still hard to model directly, e.g., using simple curve fitting.

For example, a Fourier transform and wavelet transform take a time series of data and transform it to a spectrum of different functions mapped to the data. A Fourier transform uses sin and cos functions, where a wavelet transform uses a custom defined wavelet kernel. Kurtosis is a statistical metric used to define/measure the tailedness of a distribution. Tailedness is a metric that can define how often outliers occur. Since the failure is not a regular feature of the signal received from the sensors, any measure of outliers from the data may be useful in characterizing the data. For example, data sets with high kurtosis tend to have heavy tails, or outliers. Data sets with low kurtosis tend to have light tails, or lack of outliers. Functionally it is defined as kurtosis=fourth central moment/$\sigma^4$, where $\sigma$ is the standard deviation of the distribution.

During the quasi-steady phase, the monotonically increasing features 204 are monitored but are not necessarily useful for estimating RUL. At the quasi-steady phase, degradation occurs slowly, e.g., it can remain in this state for years. The features 204 are used during the quasi-steady phase to enable detection 206 of an elbow point, e.g., via a binary classification model enable detection. After elbow point is detected 206, failure may happen over a much smaller timescale, e.g., days, so elbow point detection 206 triggers a different type of prognostics data analysis.

To detect 206 the elbow point, a binary classification model (e.g., a K-nearest neighbor or support vector classification) can be set up to monitor the features 204. When the features 204 exhibits behavior of accelerated degradation (e.g., a threshold number of features are classified as being in an accelerated degradation classification instead of a quasi-steady phase classification), the prognostics monitoring system declares that the asset 200 has transitioned to the active/faster degradation phase. It is here that the RUL models take up the task to make actionable predictions regarding end of useful life, impending failures, etc.

Figure 3:
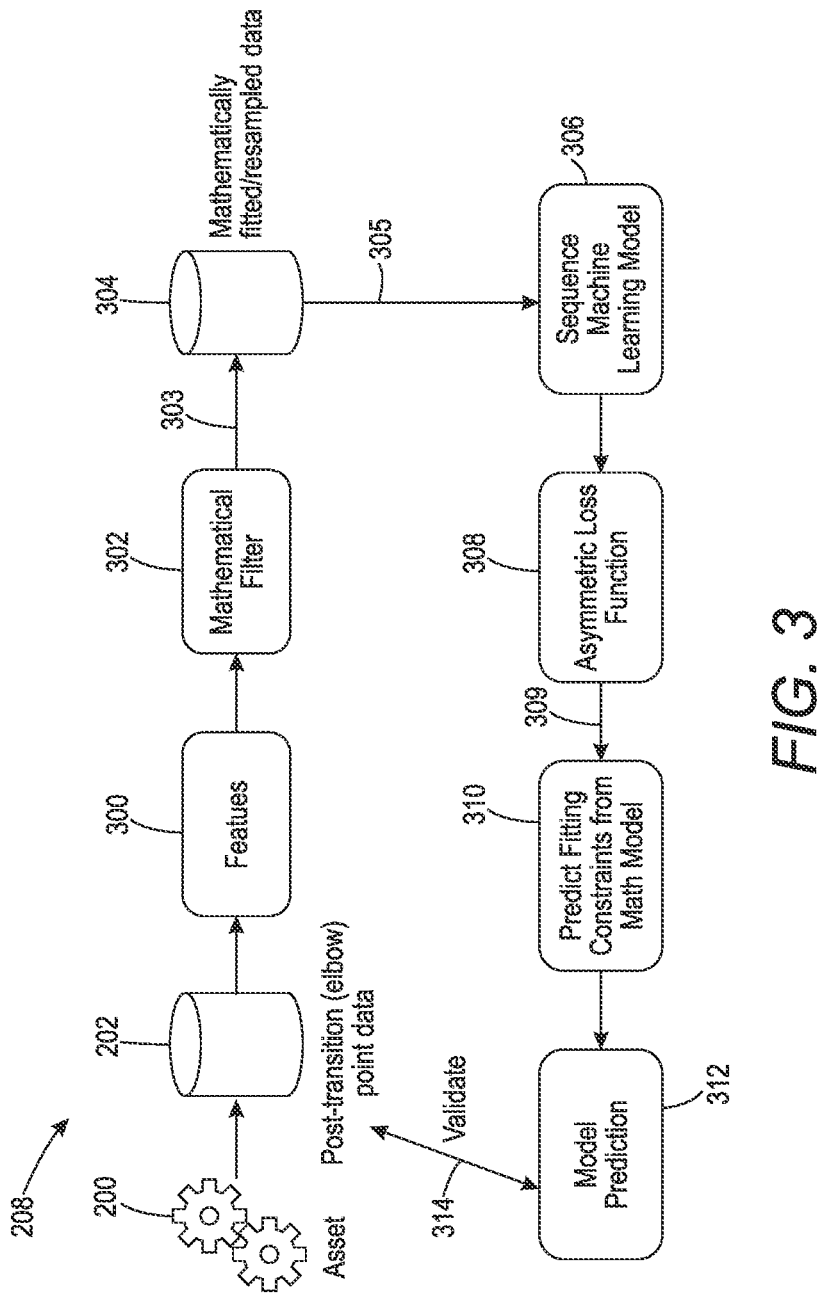

After the elbow point detection 206, end-of-life estimation 208 begins (transition from phase 104 to 106 in FIG. 1) using the appropriate RUL model. In FIG. 3, a block diagram shows a workflow for processing and interpreting the sensor data 202 during the end-of-life estimation 208 according to an example embodiment. As seen in FIG. 3, features 300 are extracted from measurement data 202 of the engineering system, e.g., from raw signals, processed/filtered sensor data, etc. The features 300 used in this stage may be different than the features 204 extracted in the previous stage, although some characteristics about the features 204, 300 may be the same (e.g., monotonically increasing).

The features 300 are processed via a conformal mathematical filter 302 that causes the features 300 to conform to a wear curve formulation associated with the asset 200. The filter 302 infuses domain knowledge into the system. For example, the filter 302 can be based on previously known or understood dynamics/physics. The form of the filter 302 can sometimes also come from other studies that fit models to data. An output 303 of the filter 302 results in mathematically fitted/resampled data 304, which is the basis of a noise-reduced signal 305.

For example, mathematical filtering may include fitting the features 300 to a predetermined trend, e.g., a discrete time function f(t) with parameters a, b, and c, where the parameters are determined by a least squares fit of f(t) to the features 300. A subset of the features 300 that conform to this fit within some threshold can be selected as the mathematically fitted/resampled data 304, the rest being rejected as outliers. Instead or in addition, a transform of the data (e.g., shift, compression) can be performed to reduce the number of outliers. By rejecting outliers through mathematical filtering, the subsequent processing of the data 304 will tend to perform better.

The noise-reduced signal 305 is input to a sequence machine learning model 306, e.g., a neural ODE, RNN, etc. An asymmetric loss function 308 used to train the sequence machine learning model 306 training of the model results in an increased penalty to overprediction and a relaxed penalty for underprediction. An output 309 of the sequence machine learning model 306 provides predictions 310 of fitting constants for an RUL mathematical model. The RUL mathematical model is used to predict the RUL predict RUL of the asset, as indicated by block 312.

The mathematical filters 302 allow this approach to be generalized over different domains. This relates to the general nature of different mathematical filters that are commonly found/relevant across engineering asset classes. The class/family of degradation applied via the filter may be based on a number of known degradation modes, such as crack propagation, chemical reactions, tool degradation, abrasive wear, adhesive wear, surface fatigue, fretting wear, erosive wear, corrosion wear, oxidation wear, impact wear, cavitation wear, and diffusive wear. The following describes examples of mathematical models for a few of these degradation modes.

Figure 4:
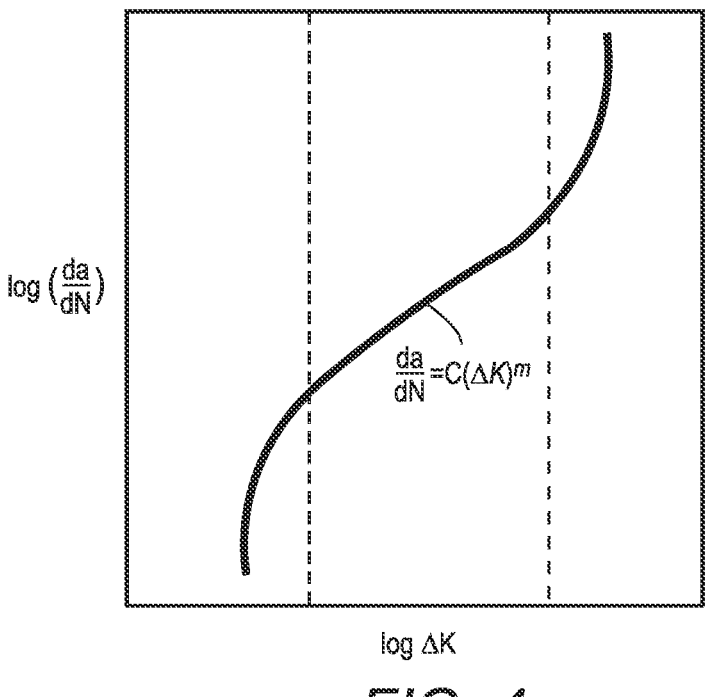
FIGS. 4-7 are graphs showing various wear models that can be used to form a conformal mathematical filter according to example embodiments.
Figure 5:
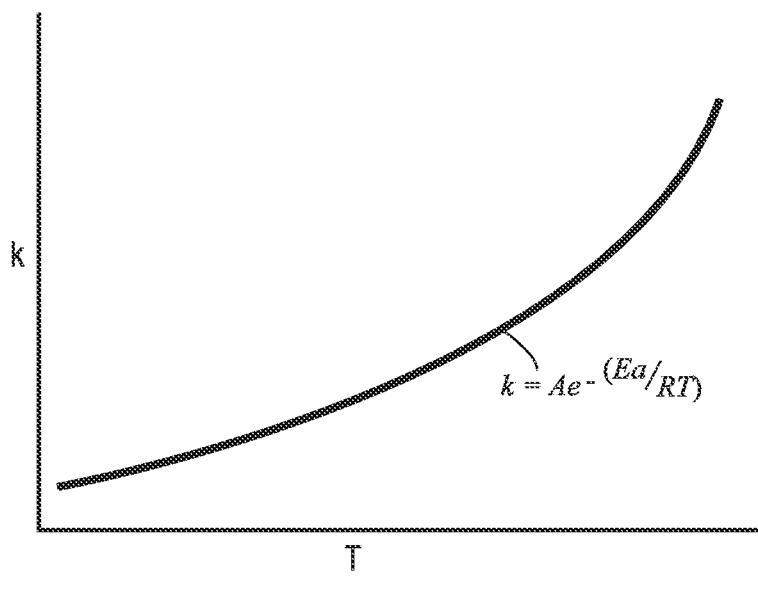
Figure 6:
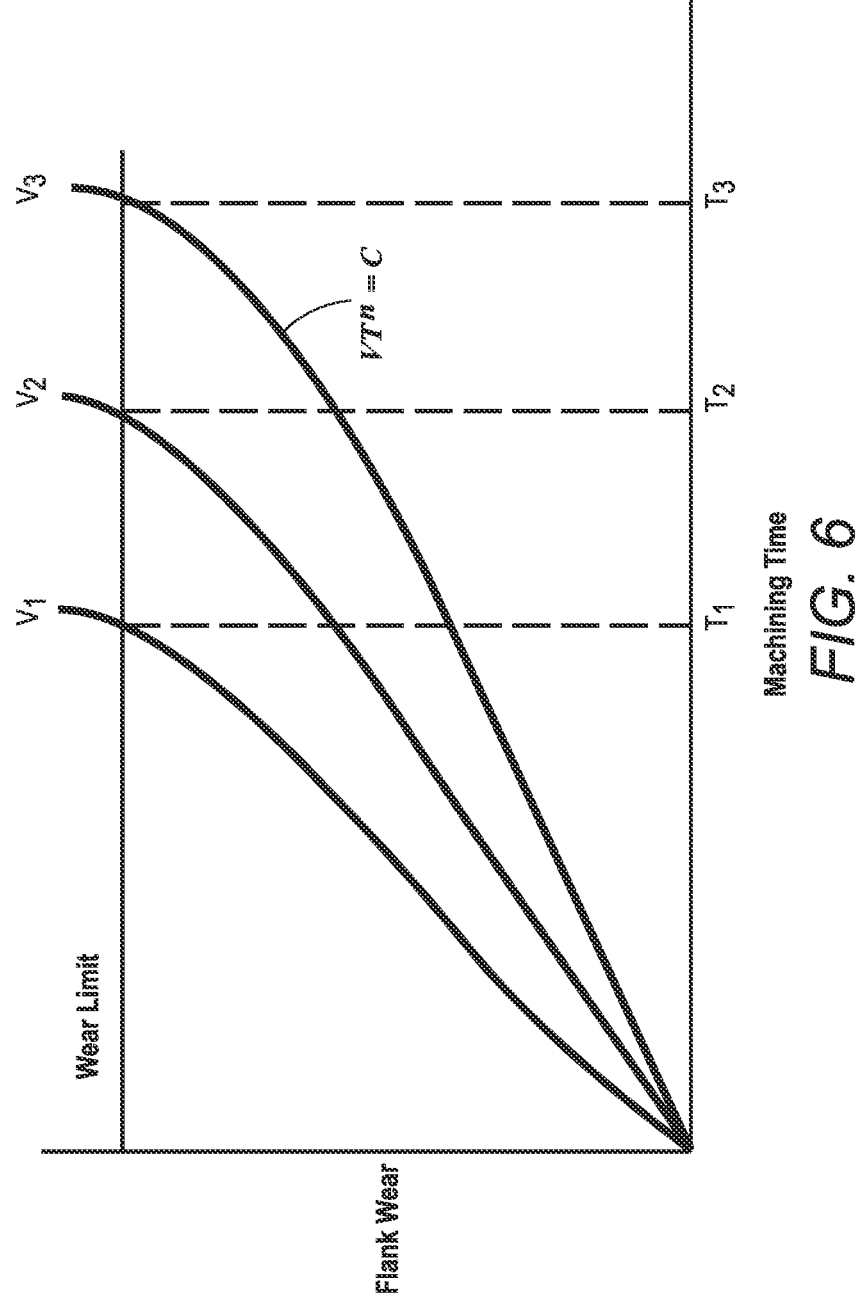
Figure 7:
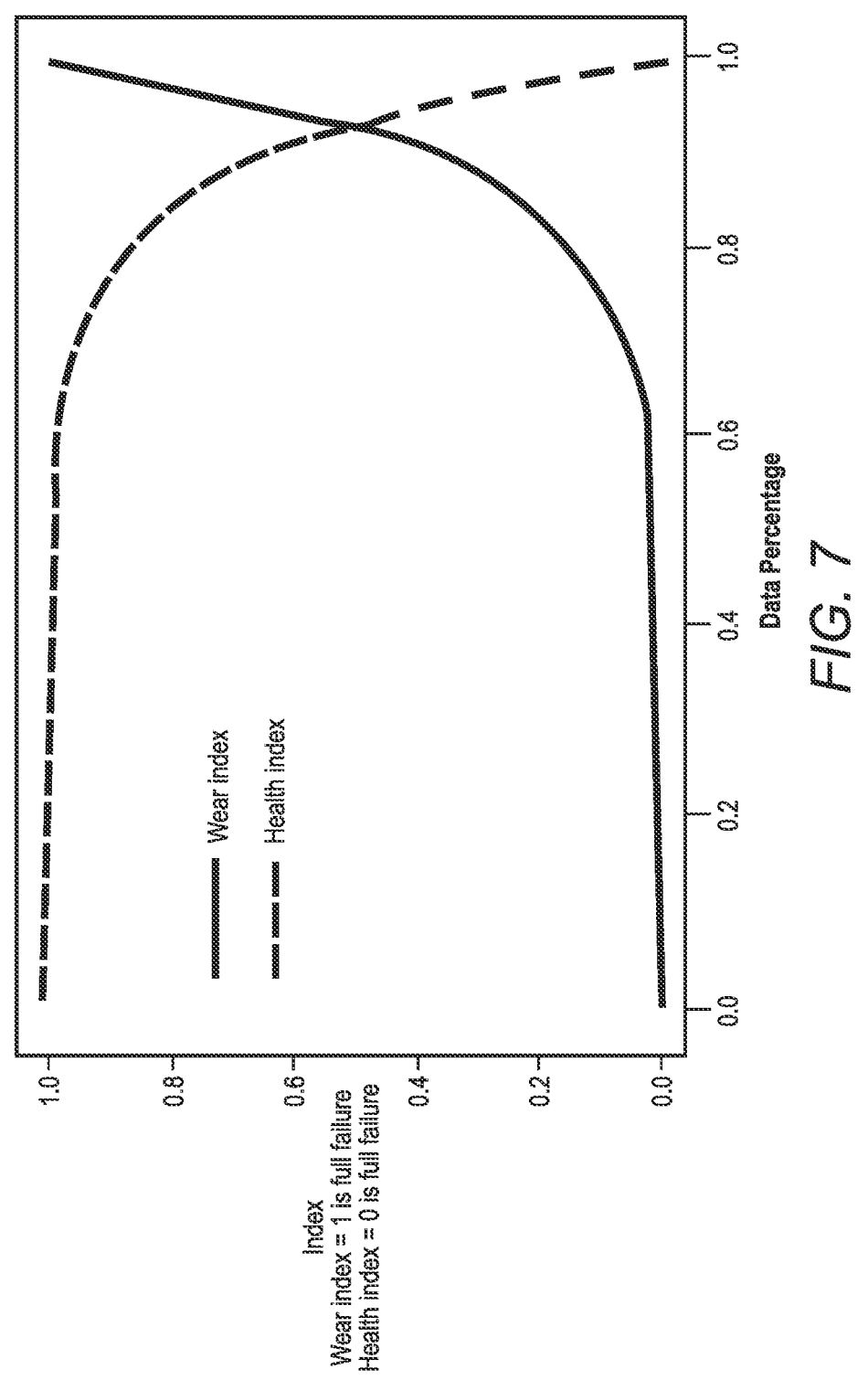

Crack propagation is modeled by Paris equations, functionally represented as shown in Equation (1) below, and which holds within a stress intensity range between the dashed lines in the graph of FIG. 4.

$$\frac{da}{dN} = C(\Delta K)^m \tag{1}$$

where:
a: crack length
N: load cycle
C: material coefficients
K: stress intensity factor
m: experimental constant Chemical reactions are modeled by Arrhenius equation, functionally represented as in Equation (2) below. This relation is shown in the graph of FIG. 5.

$$k = Ae^{-(Ea/RT)} \tag{2}$$

where:

k: rate constant
A: pre-exponential factor
Ea: activation energy
R: universal gas constant
T: absolute temperature Tool degradation modeled by the Taylor curve, functionally represented as in Equation (3) below. This relation is shown in the graph of FIG. 6. The different curves represent different wear rates for different cutting speeds $V_1 > V_2 > V_3$.

$$VT^n = C \tag{3}$$

where:

V: cutting speed in meter per minute
T: tool life in minutes
n: an index related to cutting tool material (for ex., for speed tools, n=0.1 to 0.5)
C: a constant. It is numerically equal to the cutting speed that gives tool life of one minute Corrosion modeled by the Butler-Volmer equation, shown in Equation (4) below.

$$j = j_0 \left\{ \exp\left[ \frac{\alpha_a z F \eta}{RT} \right] - \exp\left[ -\frac{\alpha_c z F \eta}{RT} \right] \right\} \tag{4}$$

where:

j: electrode current density, A/m2 (defined as j=I/S)
jo: exchange current density, A/m2
E: electrode potential, V
E_eq: equilibrium potential, V
T: absolute temperature, K
z: number of electrons involved in the electrode reaction
F: Faraday constant
R: universal gas constant
$\alpha_c$: so-called cathodic charge transfer coefficient, dimensionless
$\alpha_a$: so-called anodic charge transfer coefficient, dimensionless
$\eta$: activation overpotential While the above mathematical models are specific to a particular degradation mode, other engineering assets may follow similar modes. An example of such assets includes engines (e.g., Commercial Modular Aero-Propulsion System Simulation (C-MAPSS) dataset), batteries (ex. NASA battery dataset), that feature a monotonically increasing wear index (W.I.) or inversely a decreasing health-index (H.I.), functionally they can be represented as W.I=1−H.I. A simplified and normalized representation of the wear and health index interplay is shown in the graph of FIG. 7. This step helps incorporate known physical laws explicitly. In scenarios where known physical laws are unclear, common degradation patterns can be explicitly encoded.

For the machine learning model, any popular sequence-based approach (such as RNN, long short-term memory, etc.) is expected to perform well. As a representative method we show here the Neural ODE models, as it can be effectively used to model dynamical systems. The sequence based neural network can be trained (e.g., supervised training) using an appropriate data set. For example, if the there is insufficient data for the target asset to train the network, a data set from a data set from a system that is predicted to exhibit a wear trend similar to the wear curve of the targeted asset. Once the prognostics system has been running long enough to experience actual failures, these assumptions can be validated (see, e.g., validation 314 in FIG. 3).

The typical wear degradation curves are functionally dependent on many factors. Key among them are the initial conditions, and operating conditions (including environment). For example, in the case of bearings geometric features ($geom_f$) of importance are the bearing diameter, bearing material properties, environmental ($env_f$) conditions of relevance are relative humidity, and impacting operating conditions ($op_f$) are the load, rpm and temperature.

$$\text{wear curve} = G\left( geom_f, env_f, op_f \right) \tag{5}$$

While the exact nature of the mathematical formulation is often not well known, a family of differential equations are expected to sufficiently represent these wear curves. For example, a model wear degradation curve could be functionally represented in the neural networks as in Equation (6) below, where $x_t$ and $\theta_t$ are the system state and neural network parameters at time t.

$$x_{t+1} = x_t + f(x_t, \theta_t)\Delta t \tag{6}$$

If $\Delta t=1$, it can be re-written as in Equation (7) below, which represents a standard ODE function that can be solved using popular numerical integrators (e.g., Euler, Runge-Kutta, etc.).

$$\frac{dx}{dt} = f(x_t, \theta_t) \tag{7}$$

Figure 8:
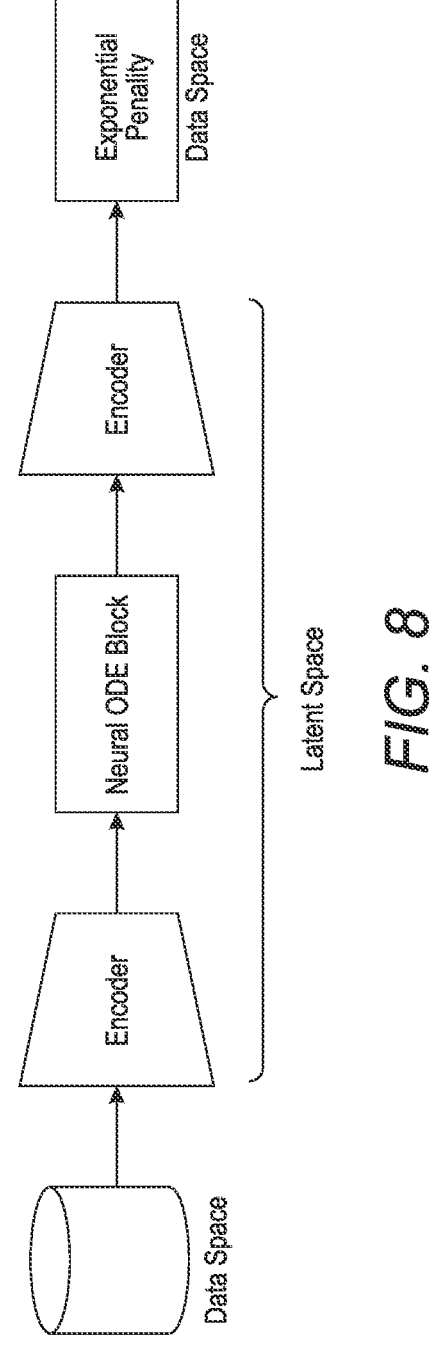
FIG. 8 is a block diagram of a machine learning model according to an example embodiment.

In the recent years, neural ODE models have found some attention in the predictive health maintenance tasks. These studies range from applying these models for battery degradation (Pepe et al. 2022) and aircraft engine degradation tasks (Star et al. 2021, Enciso-Salas et al. 2021). These degradation patterns typically have a smooth profile and have shorter timescales for the quasi-steady phase (corresponds to an easier fit to data for ODE models). However, in the case of bearings, where the field data is noisy, with very long quasi-steady phase applying neural ODE models is challenging. Therefore, following the work of Rubanova et al. (2019), we apply the latent ODE formulation of this model where the data is transformed into a latent space using an encoder-decoder block as seen in the diagram of FIG. 8. In this model, the neural ODE learning occurs in the latent space.

The learning process with limited data can be improved by adding additional penalty loss functions. The penalty term can be non-unique and application specific. However, the typical behavior would be to have an asymmetric penalty to overprediction (late predictions) and a relaxed penalty for underprediction (early prediction). This effectively produces a conservative model, that consistently under-predicts. A first step is to calculate the degree of error (positive or negative) as in Equation (8) below.

$$\% \, Er_i = 100 \times \frac{ActRUL_i - RUL_i}{ActRUL_i} \qquad (8)$$

Figure 9:
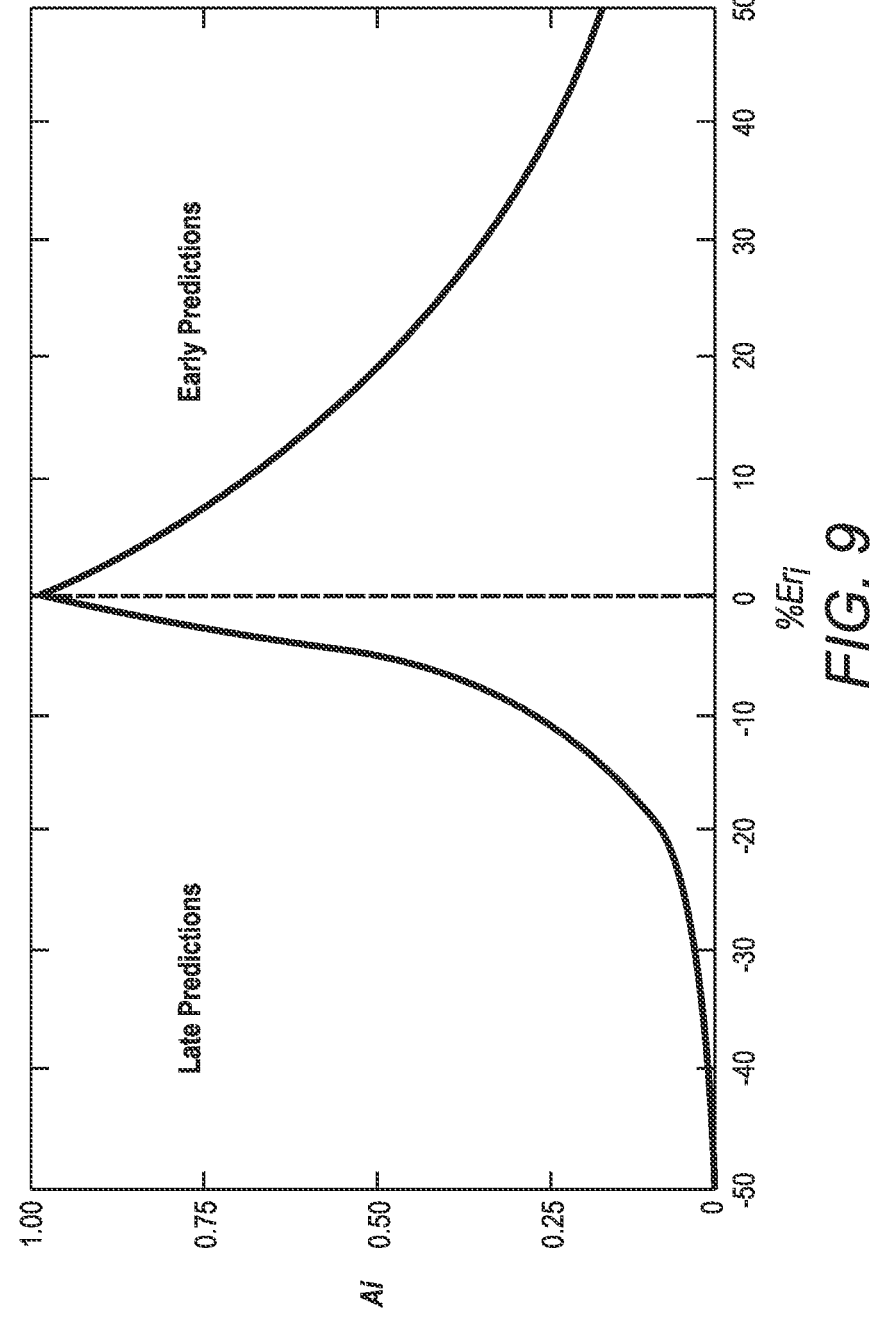
FIG. 9 is a graph showing an example asymmetric, machine learning loss function according to an example embodiment.

Based on the sign of the error, different metrics can be applied for a model to be more conservative (or vice versa). The example shown in FIG. 9 adds an excessive penalty for overprediction and an almost linear penalty for underprediction. The degree of conservativeness can be further modulated by changing the constants of the said formulation, as shown in Equation (9) below.

$$A_i = \begin{cases} \exp\left(-\ln(0.5) \times \left(\frac{Er_i}{5}\right)\right) & \text{if } Er_i \le 0) \\ \exp\left(\ln(0.5) \times \left(\frac{Er_i}{20}\right)\right) & \text{if } ER_i > 0 \end{cases} \qquad (9)$$

Functionally the overall loss used for backpropagation in the Neural ODE model can be represented as loss=data loss (actual−truth)+λ*penalty loss (A$_i$), where λ is a regularization term set to 1 in our experimentation.

Figure 10:
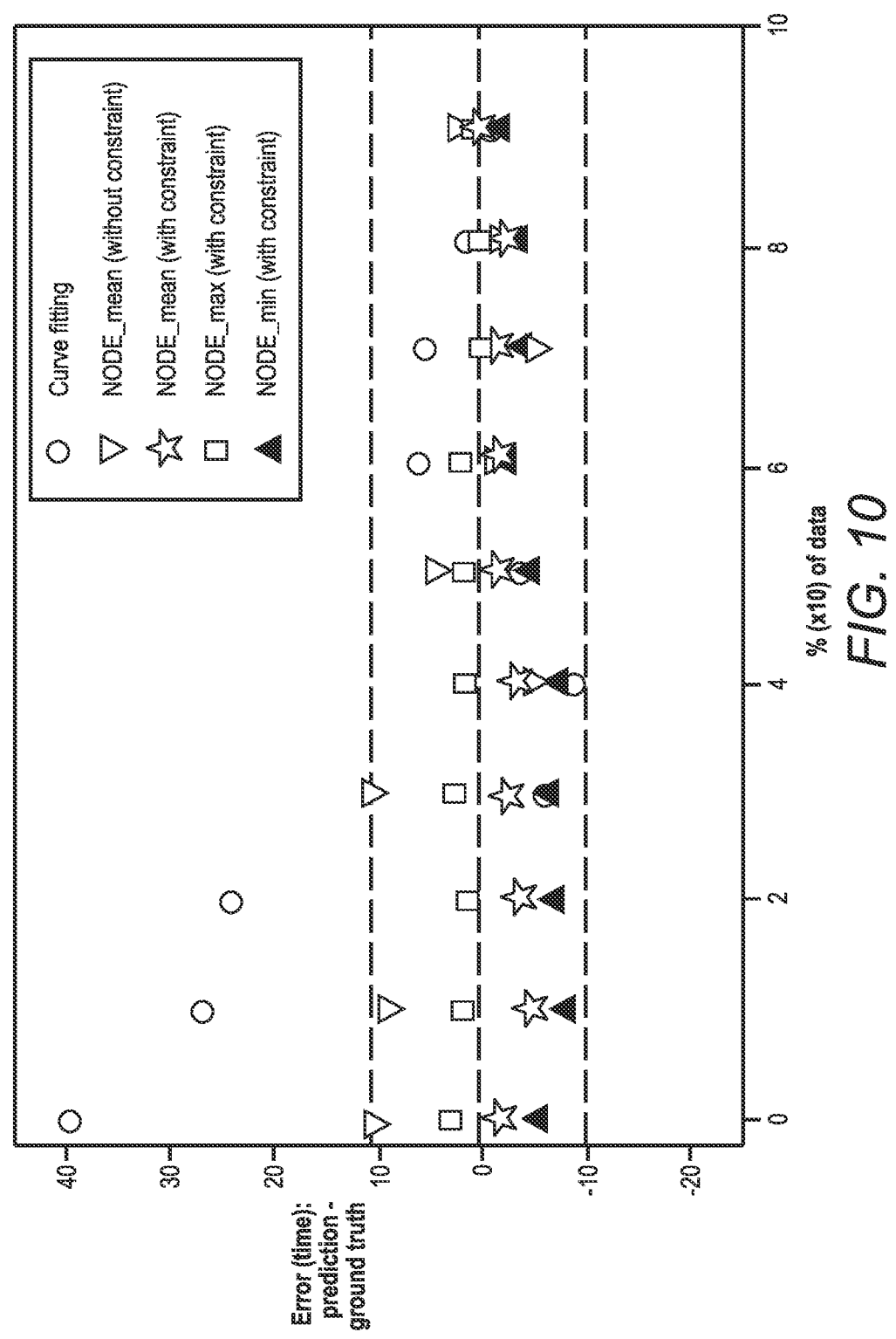
FIGS. 10 and 11 are plots showing experimental results for a prognostics model according to an example embodiment.
Figure 11:
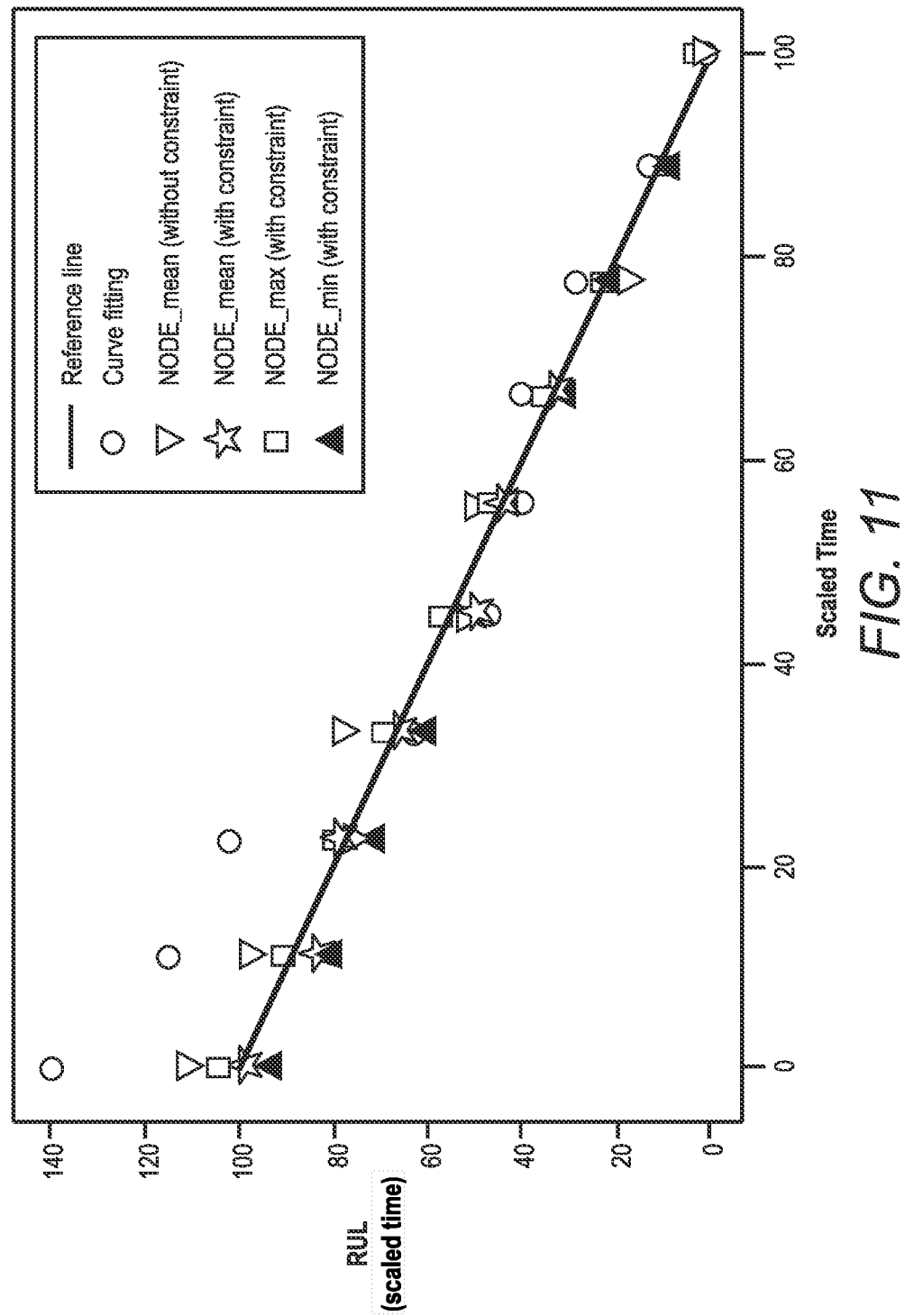

Example, for a run-to-failure bearing dataset problem, the α—λ plot in FIGS. 10 and 11 shows demonstrable improvement in model prediction for neural ODE (sequence) based models that learn under exponential constraints. General examples of other loss functions can be, for early predictions, piecewise linear: for x<0: a*x; for x>=0 b*x; where a>b. For late predictions, a quadratic loss function may be used: for x<0: a*x$^2$; for x>=0 b*x$^2$; where a>b.

Figure 12:
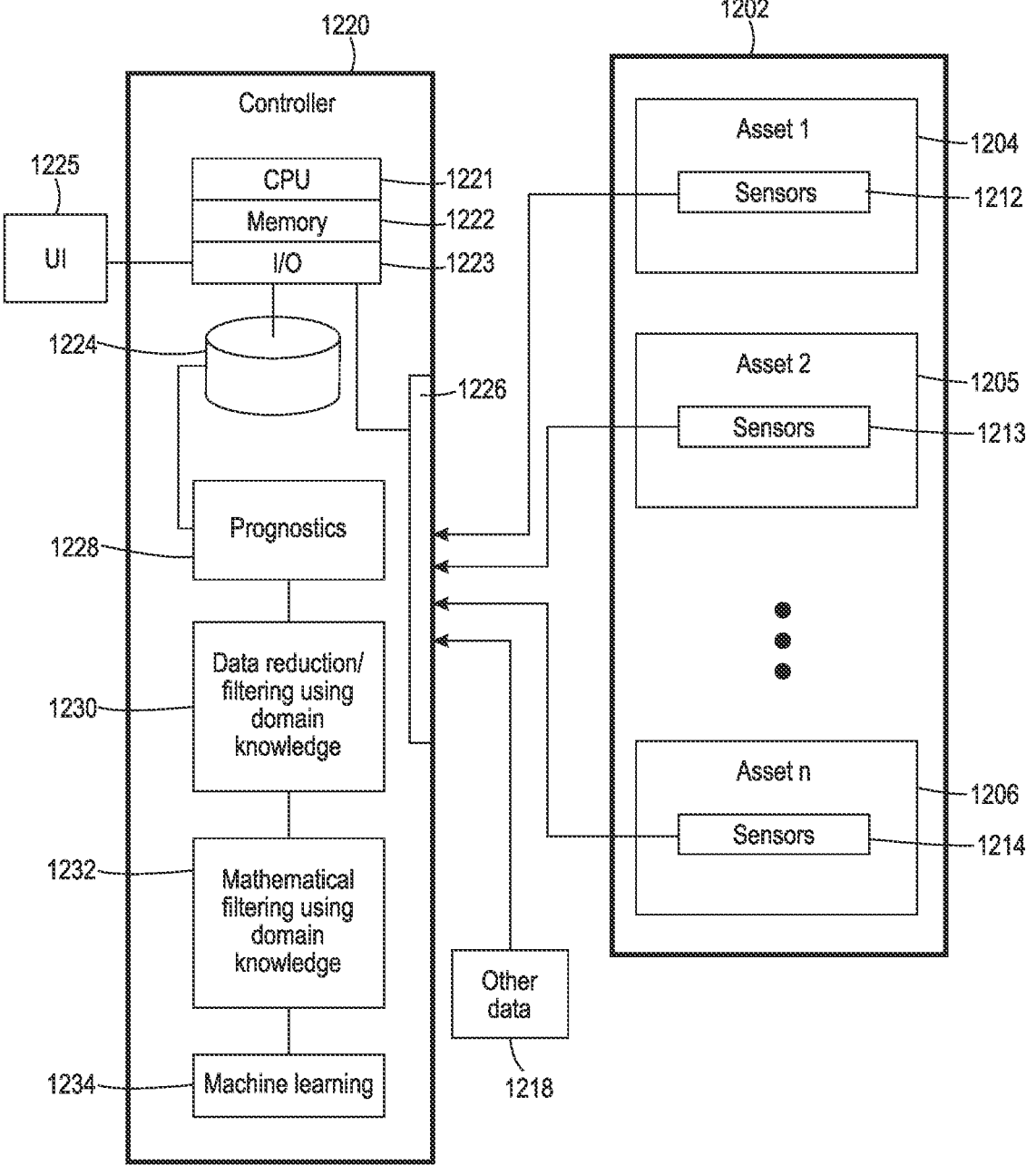
FIG. 12 is a block diagram of a system and apparatus according to an example embodiment.

Note that the embodiments above can be implemented in a computer implemented monitoring system. In FIG. 12, a block diagram illustrates a system 1200 according to an example embodiment. The system 1200 includes an engineering system 1202 that includes a one or more assets 1204-1206 that may include different apparatuses used within the system. For example, the assets 1204-1206 may include various electrical and/or mechanical component of a self-contained system, e.g., aircraft, data center, etc. The assets 1204 may be physically remote from one another, e.g., power components in a municipal electric grid.

Each of the assets 1204-1206 is associated with sensors 1212-1214 (e.g., temperature sensors, flow sensors, radiation sensors, accelerometers, voltage and current sensors, etc.) that provide prognostics data that can be fed into a monitoring system 1220. Other sources of data 1218 may also be used as inputs to the monitoring system 1220, such as ambient temperatures (e.g., weather data), operational schedules, etc.

The monitoring system 1220 may include conventional computing hardware such as a central processing unit (CPU) 1221, memory 1222, input/output (I/O) interfaces 1223, and a non-volatile data storage unit 1224 (e.g., hard disk drives, solid state drives). The monitoring system 1220 includes an external data interface 1226 that receives data from the sensors 1212-1214 and produces outputs that can be acted on via a user interface 1225 that communicates RUL data to the user. The data storage unit 1224 stores a prognostics model 1228 of the assets 1204-1206 that predicts degradation/health of each asset based on the historical and present sensor data.

During operation of the system 1200, e.g., when the system 1200 is actively monitoring the assets 1204-1206, a data reduction/feature extraction module 1230 reduces time series data into features, e.g., spectra, wavelet kernels, statistical parameters, etc., that reduce the size of the data and help filter out irrelevant data and unlock damage relevant signatures. As described above, once an advanced degradation stage is detected, these features can be further processed by a mathematical filter 1232 that uses domain knowledge to further shape the data, which can then be processed by a machine learning module 1234 which ultimately provides an estimate of health/degradation of the assets 1204-1206 that can be acted upon, e.g., automatic remediation or by a user via user interface 1225. Examples of automatic remediation include stopping operation of an asset, lowering workload of an asset, swapping in a spare, etc.

The various embodiments described above may be implemented using circuitry, firmware, and/or software modules that interact to provide particular results. One having skill in the arts can readily implement such described functionality, either at a modular level or as a whole, using knowledge generally known in the art. For example, the flowcharts and control diagrams illustrated herein may be used to create computer-readable instructions/code for execution by a hardware processor. Such instructions may be stored on a non-transitory, computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality.

Terms related to orientation, such as "top," "bottom," "side," and "end," are used to describe relative positions of components (e.g., as arranged in the figures) and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiment.

References to a "combination" of different elements is also meant to include each element on its own unless otherwise indicated. For example, a combination of A, B, and C may include any one of A, B, or C alone, as well as A+B, A+C, A+B+C, etc. Further, where the elements of the combinations are actions (e.g., steps of a method), the listing of actions is not meant to imply a specific order that the actions may be taken in the combination unless otherwise indicated.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A computer-implemented method comprising:
based on sensor measurements received from an asset of an engineering system, determining that the asset has transitioned from a quasi-steady degradation stage to an accelerated degradation phase; and
during the accelerated degradation phase:
extracting features from the sensor measurements that are indicative of wear of the asset;
applying a conformal mathematical filter to the features, the conformal mathematical filter causing the features to conform to a wear curve formulation associated with the asset, an output of the filter being resampled to form a noise-reduced signal;
inputting the noise-reduced signal into a sequence machine learning model, a loss function of the sequence machine learning model using an increased penalty to overprediction and a relaxed penalty for underprediction; and
using an output of the sequence machine learning model to predict a remaining useful life (RUL) of the asset.

2. The method of claim 1, wherein the wear curve formulation is based on a physics-based behavioral model.

3. The method of claim 2, wherein the physics-based behavioral model is a crack propagation formulation.

4. The method of claim 2, wherein the physics-based behavioral model is a tool degradation formulation.

5. The method of claim 2, wherein the physics-based behavioral model is a chemical reaction formulation.

6. The method of claim 2, wherein the physics-based behavioral model is a corrosion formulation.

7. The method of claim 2, wherein the physics-based behavioral model is based on one of adhesive wear, surface fatigue, fretting wear, erosive wear, corrosion wear, oxidation wear, impact wear, cavitation wear, and diffusive wear.

8. The method of claim 1, wherein the sequence machine learning model comprises a recurrent neural network.

9. The method of claim 1, wherein the sequence machine learning model comprises a physics-informed neural network.

10. The method of claim 1, wherein the sequence machine learning model comprises an ordinary differential equation (ODE) neural network.

11. The method of claim 10, wherein the ODE neural network comprises an encoder-decoder block that transforms the noise-reduced signal into a latent space, and wherein learning occurs in the latent space.

12. The method of claim 1, further comprising using the output of the sequence machine learning model to predict fitting constants for an RUL mathematical model, the RUL mathematical model being used to predict the RUL.

13. The method of claim 1, wherein the sequence machine learning model is trained using a data set exhibiting a wear trend predicted to be similar to the wear curve of the asset.

14. The method of claim 1, wherein determining that the asset has transitioned from the quasi-steady degradation stage to the accelerated degradation phase comprises monitoring derived features from the sensor measurements and detecting an elbow point using a binary classifier, the detecting of the elbow point indicating a start of the accelerated degradation phase.

15. A system, comprising:
an engineering system comprising:
one or more assets; and
one or more sensors that provide prognostics data about the one or more assets; and
a monitoring system coupled to the engineering system, the monitoring system comprising:
an external data interface that receives the prognostics data from the one or more sensors;
a processor coupled to the external data interface and operable to perform, during an accelerated degradation phase of the one or more assets:
extracting features from the prognostics data that are indicative of wear of the asset;
applying a conformal mathematical filter to the features, the conformal mathematical filter causing the features to conform to a wear curve formulation associated with the asset, an output of the filter being resampled to form a noise-reduced signal;
inputting the noise-reduced signal into a sequence machine learning model, a loss function of the sequence machine learning model using an increased penalty to overprediction and a relaxed penalty for underprediction; and
using an output of the sequence machine learning model to predict a remaining useful life (RUL) of the asset; and
a user interface coupled to the processor that communicates the prediction of the RUL to a user.

16. The system of claim 15, wherein the wear curve formulation is based on a physics-based behavioral model.

17. The system of claim 15, wherein the sequence machine learning model comprises one of a recurrent neural network, a physics-informed neural network, and an ordinary differential equation neural network.

18. The system of claim 15, wherein the sequence machine learning model is trained using a data set exhibiting a wear trend similar to the wear curve.

19. The system of claim 15, wherein the processor is further configured to determine that the asset has transitioned from a quasi-steady degradation stage to the accelerated degradation phase.

20. The system of claim 19, wherein determining that the asset has transitioned from the quasi-steady degradation stage to the accelerated degradation phase comprises monitoring derived features from the sensor measurements and detecting an elbow point using a binary classifier, the detecting of the elbow point indicating a start of the accelerated degradation phase.

* * * * *